Sept. 19, 1933.　　　　H. D. STEVENS　　　　1,927,811
MACHINE FOR MAKING TIRE BEAD CORES
Filed Feb. 12, 1932　　　5 Sheets-Sheet 3

INVENTOR
Horace D. Stevens
BY
ATTORNEYS

Sept. 19, 1933.  H. D. STEVENS  1,927,811
MACHINE FOR MAKING TIRE BEAD CORES
Filed Feb. 12, 1932  5 Sheets-Sheet 5

INVENTOR
Horace D. Stevens
BY
ATTORNEYS

Patented Sept. 19, 1933

1,927,811

UNITED STATES PATENT OFFICE 1,927,811

MACHINE FOR MAKING TIRE BEAD CORES

Horace D. Stevens, Akron, Ohio, assignor to The Firestone Tire & Rubber Company, Akron, Ohio, a corporation of Ohio Application February 12, 1932. Serial No. 592,509

8 Claims. (Cl. 154—9)

This invention relates to apparatus for the manufacture of annular metallic cores for the beads of pneumatic tire casings, and more especially it relates to the manufacture of bead cores such as consist of a plurality of superposed convolutions of flat rubberized strip material or tape comprising longitudinal strands, usually of wire.

The chief objects of the invention are to provide a relatively simple bead core making machine; to provide a machine of the character described having numerous automatic features; to provide economy of operation; to provide a machine of the character described having two bead-core forms including means for feeding strip material in alternation to said forms; to provide conveniently for the building of tire bead cores that are generally triangular in cross-section; and to provide for forming a loop of slack strip material anterior to the bead-core forms between operations of winding the strip material onto said forms.

Figure 1:
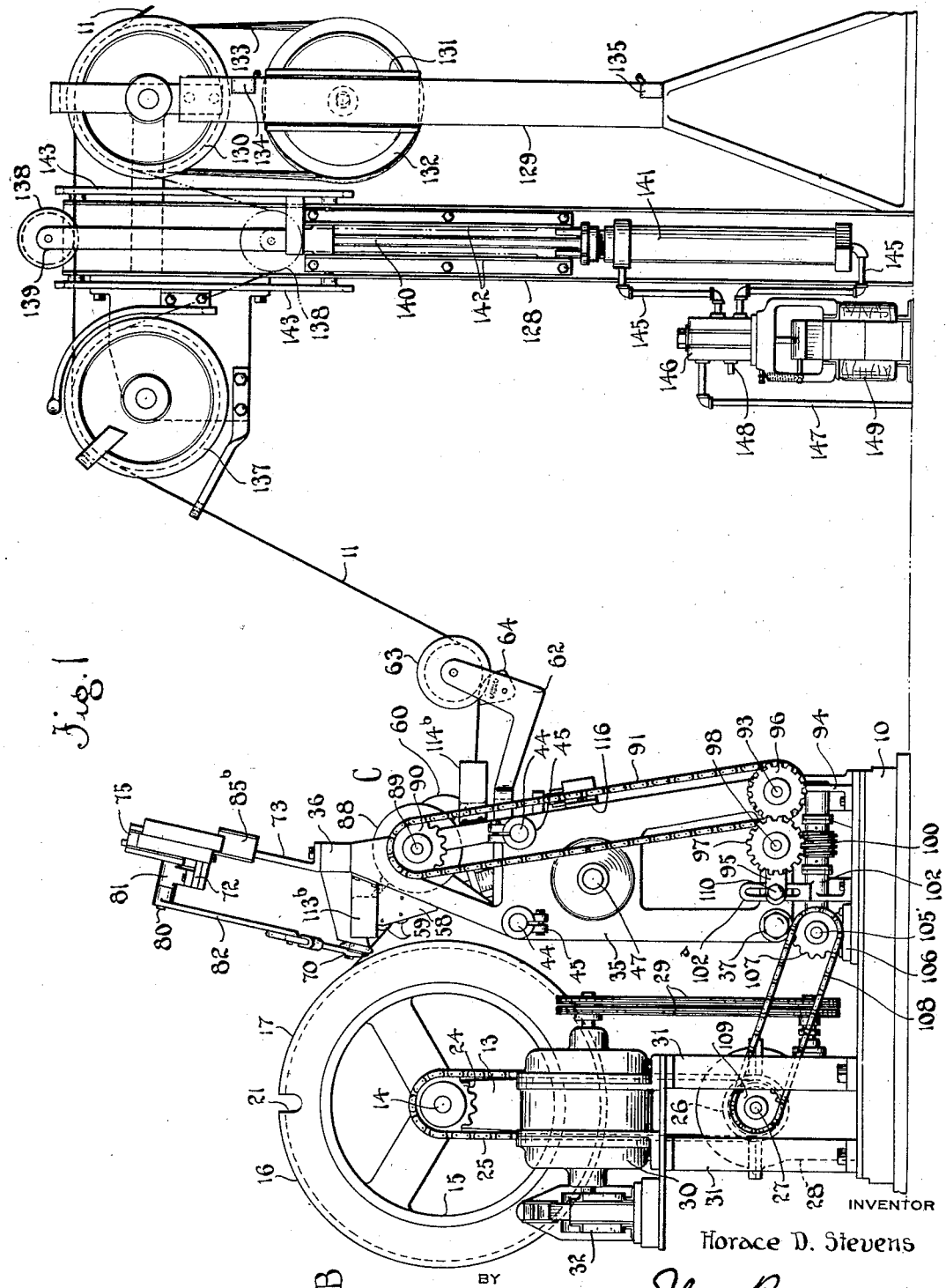
Figure 1 is a side elevation of a machine embodying the invention in its preferred form, including compensator mechanism associated therewith.

Referring to the drawings, 10 is a base plate which supports, at its rear, two bead core forming units designated A and B respectively, and at its front supports a mechanism generally designated C that guides and feeds continuous bead core forming material 11 alternately to the units A and B. The forming units A and B are identical although the core-forming forms may differ so as to produce bead cores of different diameters and in the drawings the mechanism C is shown in operative relation to the core forming unit A. Each unit is provided with individual independent driving means, so that a description of one unit will suffice for both.

Each forming unit comprises a standard 13 that rises from the base plate 10 near the rear to one side of the center thereof, the upper portion of said standard constituting a journal for a horizontal shaft 14 upon one end portion of which is mounted a wheel 15. Removably mounted upon the periphery of the wheel 15 is an annular bead-core form 16, the latter having a flat outer perimeter that is provided with a radial circumferential flange 17 on the side remote from the central transverse plane of the machine. The flat perimeter of the form 16 is slotted at 18, which slot leads to a recess 19 in the side of the form, and a pawl 20 is pivotally mounted in the recess 19 and so arranged as to engage and hold the leading end of the strip material when said end is inserted through the slot 18. The perimeter of the form 16, including the flange 17, also is recessed at 21 to permit the insertion of a suitable tool beneath a bead-core built upon the form to facilitate removal of the bead-core from the form. The feature of providing a removable core-form upon the periphery of the wheel 15 simplifies the problem of changing the machine for the building of bead cores of various sizes.

Figure 3:
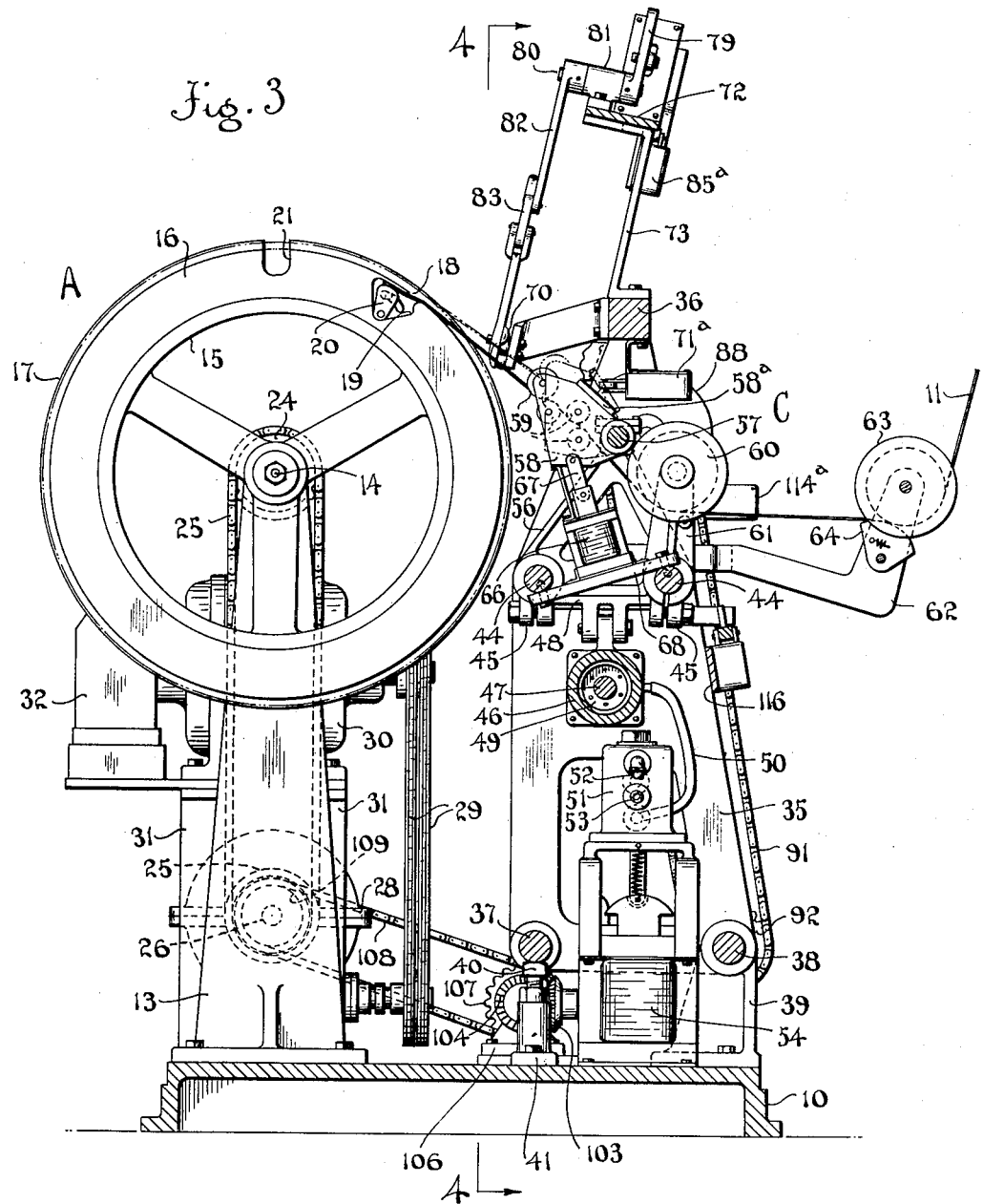
Figure 3 is a section on the line 3—3 of Figure 2, on a larger scale.

Upon the other end portion of the shaft 14 is a sprocket 24 that is connected by sprocket chain 25 with a sprocket 26 mounted upon one end of the drive-shaft 27 of a reduction gear device 28 that is mounted upon the base plate 10. The reduction gear device 28 is driven by sprocket chain 29 from a motor 30 that is mounted above the reduction gear device upon suitable brackets 31, 31, said motor being provided with an automatically operating magnetic brake 32. The motors 30 of the units A and B are so constructed as to rotate the forms 16 of the respective units always in the same direction, which is counter-clockwise as viewed in Figures 1 and 3.

The mechanism C that guides and feeds the work 11 to the core-forming units A and B comprises a pair of end frames 35, 35 connected at their tops by a cross-member 36, the end frames being supported at front and rear upon parallel bars 37, 38 respectively of which bar 38 is journaled adjacent its ends in journal brackets 39, 39 that are mounted upon base plate 10, and bar 37 is supported at its middle by a vertically adjustable stud 40 that is threaded into a supporting member 41. The arrangement is such that the angular position of the end frames 35 with relation to the forms 16 may be varied, upon occasion, as when changing the forms to other forms of different diameter.

Slidably mounted for axial movement in the end frames 35, a little above the middle thereof, is a pair of parallel, horizontal slide-rods 44, 44, the respective end portions of which are provided with adjustable stop-collars 45, 45 to limit their axial movement in both directions. For moving the slide-rods 44 axially there is provided a double-acting fluid pressure operated cylinder 46 that is mounted upon a stationary piston rod 47 that is supported from its respective ends by the end frames 35, a little below the slide-rods 44. A yoke 48 connects the slide-rods 44 to one end of the cylinder 46. The piston rod 47 carries the usual piston 49, within the cylinder 46, and flexible fluid inlet and outlet pipes 50, 50 connect the respective ends of the cylinder 46 with a valve 51 having communication with a source of pressure fluid (not shown) through a supply pipe 52, the valve 51 also having an exhaust port 53.

A solenoid 54 is provided for operating the valve 51 whereby opposite ends of the cylinder 46 are charged and discharged in alternation.

Adjustably mounted upon the slide-rods 44 is a carriage comprising a pair of triangular, spaced-apart, end-brackets 56, 56 that are secured to the slide-rods at their two lower corners and support a bar 57 at their apex. When the bead-core to be built is rectangular in section, the bar 57 is fixedly secured in the brackets 56 as shown in the drawings. If the bead-core is to be triangular in section, a special bar is substituted for the bar 57 and it is mounted for axial sliding movement in the brackets 56, means being provided for effecting such axial movement as will subsequently be explained by reference to the broken-line structure shown only in Figure 4.

Journaled for angular movement upon the bar 57 is a plate 58 upon which are journaled a plurality of flanged guide-rollers 59, 59, which rollers are arranged in suitable staggered relation to engage both sides of the strip 11 as the latter passes to a form 16. Anterior to the guide-rollers 59 is a larger guide roller 60 that is journaled in the free end of an arm 61 that is adjustably mounted upon the rear slide-rod 44. A pair of bracket-arms 62, 62 secured to the respective end-brackets 56 extend rearwardly of the machine and support a flanged guide-roller 63 that is disposed in the same plane as the guide-rollers 60 and 59 for guiding the strip material 11. A spring-urged eccentric 64 is mounted upon one of the bracket-arms 62 and engages the strip 11 on the guide-roller 63 in a manner to prevent recession of the strip, upon occasion, when the strip is not attached to a form 16.

Limited angular movement of the plate 58 upon the bar 57 is effected by means of an electrical solenoid coil 66, the core of which is connected by a link 67 to said plate. The solenoid 66 is mounted upon a plate 68 that is carried by the slide-rods 44 as is most clearly shown in Figure 3. The solenoid 66 is actuated (when the winding of a bead-core on a form 16 is completed) by means presently to be described, to lift the plate 58 whereby the strip of material 11 between the guide-rollers 59 and form 16 is carried between the blades of shears 70, as is shown in broken lines in Figure 3, to be severed by the said shears. Operation of the shears is controlled by a switch 71$a$ that is mounted on the under side of the bar 36 and operated by an ear 58$a$, that projects laterally from the plate 58, when the latter is lifted by the solenoid 66. A similar switch 71$b$ is provided on the bar 36 and so positioned as to be actuated in the same manner as switch 71$a$ when the mechanism C is in B position.

There are two shears 70, each being mounted by one handle upon the cross-member 36 and so positioned thereon that one of them is in operative relation to the material strip 11 in each of the alternative positions A or B of the carriage on the slide-rods 44. Mechanism for operating the respective shears 70 is mounted upon a shelf 72 that is supported above the machine by a pair of bracket arms 73, 73 rising from the cross-member 36. Each of the shear-operating mechanisms comprises a solenoid coil 75 having a core 76, one end of which is connected by a tension spring 77 to an upturned extension 78 of the shelf 72. The other end of the solenoid core 76 is connected to an arm 79 mounted upon one end of a short shaft 80 that is journaled in a bearing bracket 81 mounted on the shelf 72, the other end of the shaft 80 being provided with a lever arm 82 that is connected by a link 83 to the free handle of the shear 70.

The arrangement is such that a solenoid coil 75 is energized by switch 71$a$ or 71$b$, whereby the core 76 of the coil is moved axially, against the tension of the spring 77, to close the shear 70 whereby the blades thereof sever the strip material 11. Switches 85$a$, 85$b$ are mounted upon the under side of the shelf 72 over the respective A and B core forming units, each switch being operated by a finger 86 projecting downwardly from the rear end of one of the solenoid cores 76. Switches 85$a$, 85$b$ control the operation of solenoid 54, the arrangement being such that actuation of switch 85$a$ causes the valve 51 to be turned to cause the cylinder 46 to move the mechanism C from in front of the A core forming unit to a similar position in front of B unit. The operation is reversed when switch 85$b$ is actuated. Movement of the mechanism C away from position A or B causes solenoids 66 and 75 to be de-energized, as presently will be described, and permits plate 58 and the shears to resume their normal positions.

The machine is adjusted so that each form 16 makes a determinate number of revolutions during each cycle of operation, and if desired, the number of revolutions made by the respective forms may differ. Whatever the number of revolutions made by the respective forms during an operative cycle, there is but one-half a revolution made by a rotary cam disc 88 during the same interval, there being one of the latter for each winding unit A and B. The cam discs 88 are similarly constructed and arranged so that but one need be described.

Figure 5:
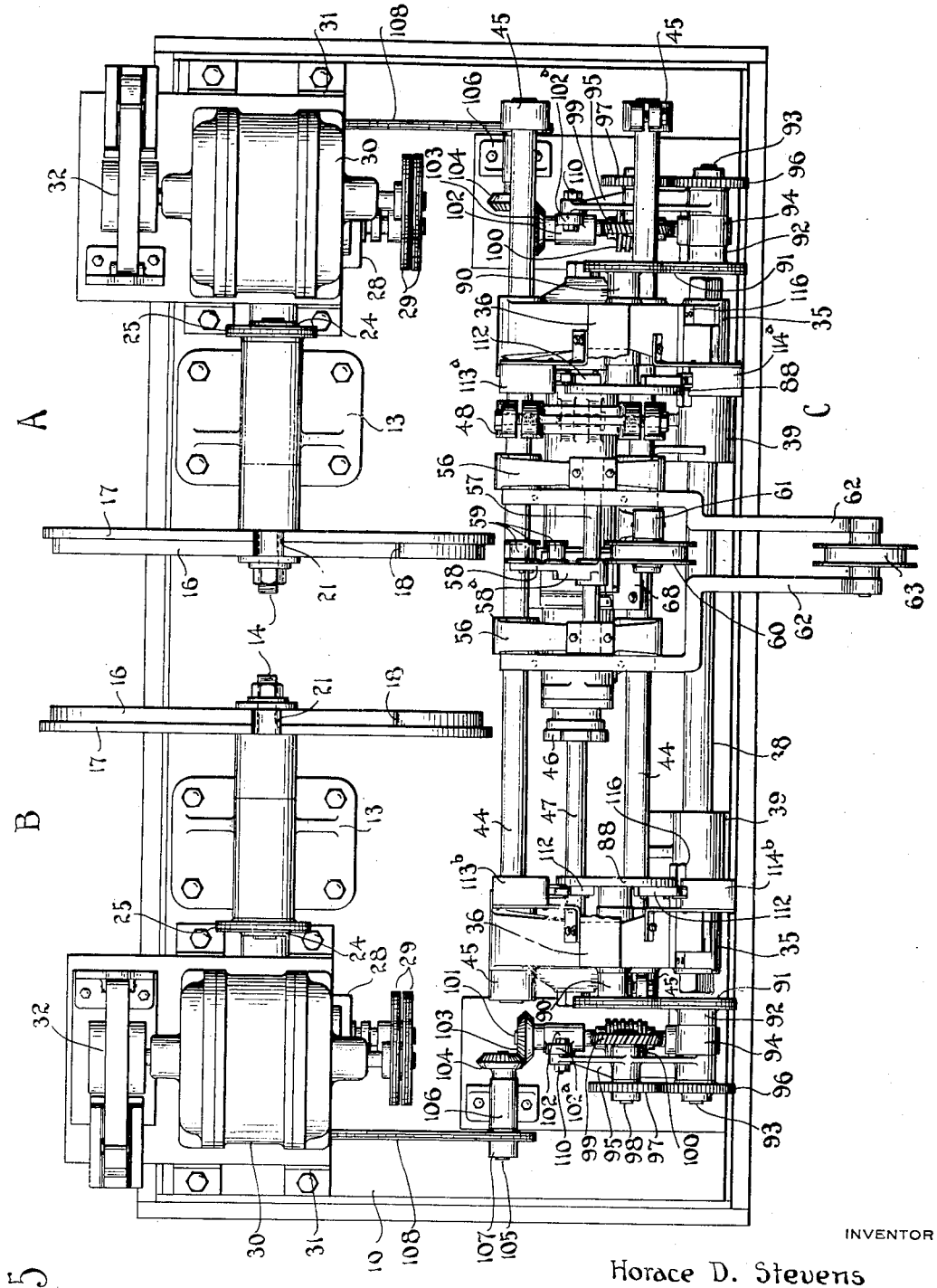
Figure 5 is a plan view of the machine, the upper part of the structure being broken away.

Each cam disc 88 is mounted upon the inner end of a shaft 89 that is journaled in a suitable bearing in the upper part of an end frame 35, the outer end of the shaft 89 being provided with a sprocket 90 that is connected by a sprocket chain 91 with a sprocket 92 that is mounted upon one end of a shaft 93 that is journaled in a bearing bracket 94 mounted upon the base plate 10. The other end portion of shaft 93 has swiveled thereon a journal arm 95 and a gear 96, the latter meshing with a gear 97 that is mounted upon a countershaft 98 journaled in journal arm 95, and said countershaft 98 has its other end provided with a worm gear 99 that meshes with a worm 100 carried by a shaft 101 journaled in a bearing bracket 102 and bearing bracket 94. Shaft 101 carries a bevel gear 103 meshed with bevel gear 104 on one end of shaft 105 that is journaled in bracket 106, the other end of shaft 105 carrying sprocket 107 connected by sprocket chain 108 with sprocket 109 on shaft 27 of the reduction gear device 28. The free end of the journal arm 95 is adjustably secured by bolt 110 to a slotted extension 102$a$ (Figures 1 and 5) of bearing bracket 102.

The arrangement is such that the forms 16 and cam discs 88 are driven at relative speeds, the ratio of which may be altered by changing the worm gears 99, the adjustable feature of the swiveled journal arm 95 permitting the change easily and quickly to be effected.

Mounted upon the rear face of each cam disc 88 and projecting beyond the perimeter thereof are cams 112, 112 disposed at diametrically opposite points thereon and adapted periodically to engage and operate a pair of electrical switches that have their operating levers projecting into the orbit of said cams. Switches associated with cam 88 in front of the A core-forming unit are designated 113ª, 114ª, and the switches associated with cam 88 in front of the B core-forming unit are numbered 113ᵇ, 114ᵇ. Switch 113ª controls the operation of solenoid 66 when the mechanism C is in front of core forming unit A, and switch 113ᵇ does the same thing when the mechanism C is in front of unit B. Switches 113ª, 113ᵇ also are in the motor control circuits of the respective motors 30 and open the circuits to the latter when the switches are depressed, whereby the motors are disconnected and are immediately stopped by their automatic magnetic brakes. Switch 114ª controls the operation of compensator mechanism presently to be described when the mechanism C is in front of unit A, and switch 114ᵇ operates similarly when mechanism C is in front of unit B.

Figure 2:
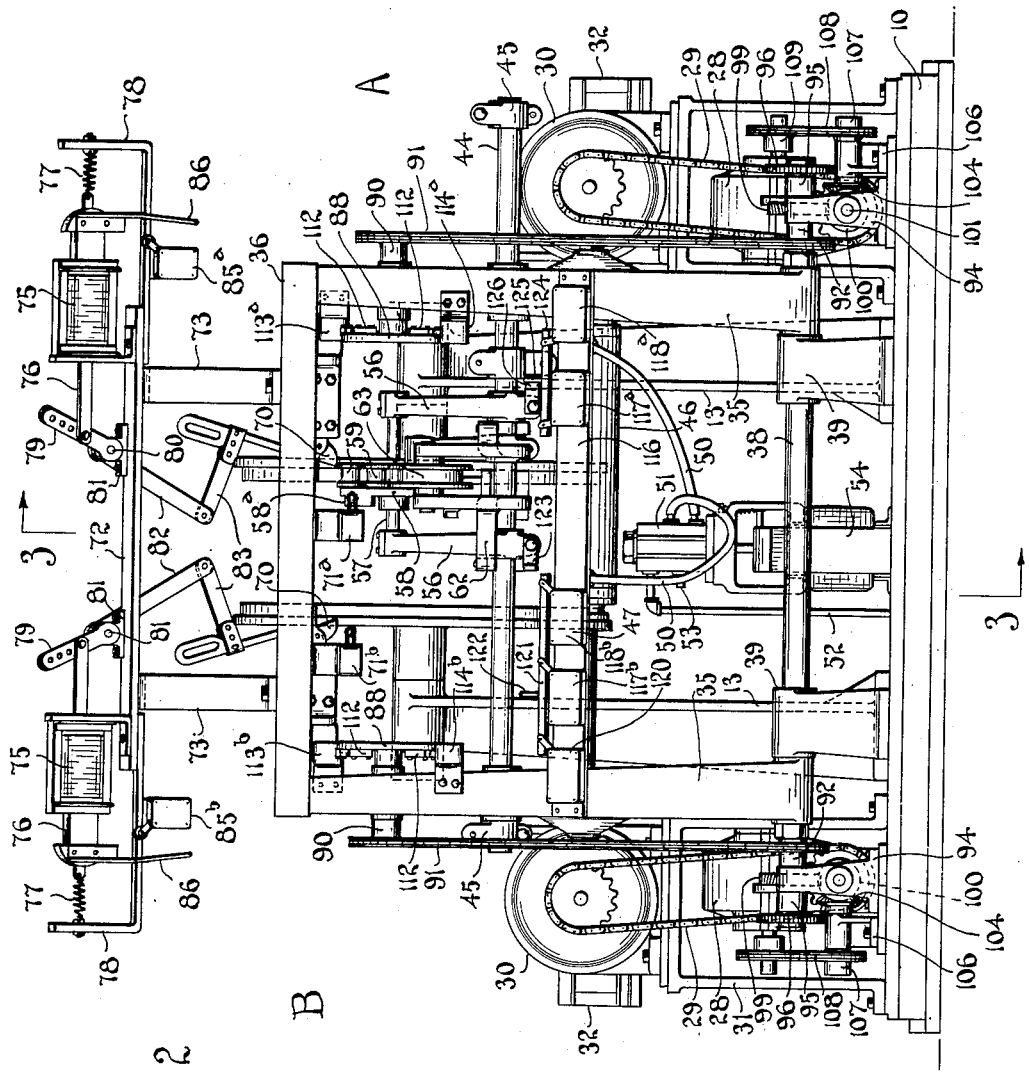
Figure 2 is a rear elevation of the machine.

Connecting the end frames 35, on the back thereof, is a transverse support 116 that carries five electrical switches, three of which are positioned at the end of the support opposite core forming unit B, and two are positioned opposite unit A, the latter switches being designated 117ª and 118ª. The switches positioned on the support 116 opposite unit B are designated 117ᵇ, 118ᵇ and 120, and the operating levers of said switches are connected by a bar 121 so as to be actuated in unison, the bar 121 being provided with an upwardly extending finger 122 that extends into the path of an abutment 123 mounted upon one end bracket 56 of the reciprocable carriage. In like manner the levers of switches 117ª, 118ª are connected by a bar 124 having an upwardly extending finger 125 extending into the path of an abutment 126 mounted upon the other end bracket 56 of the carriage. When the carriage is aligned with the A unit switches 117ª and 118ª are closed and switches 117ᵇ, 118ᵇ, and 120 are open as is shown in Figure 2. The condition of the switches is reversed when the carriage is aligned with the B unit.

Switches 118ª, 118ᵇ are master switches which prevent both motors of the machine from being operated at the same time, one of said switches always being open when the other is closed. Switches 117ª, 117ᵇ control motor-control circuits, including respective time relays (not shown) that are in the motor circuits so that when respective starting buttons (not shown) are pushed, power will be delivered to the motors until after the cams 112 move off the operating levers of the switches 113ª or 113ᵇ. Switches 117ª, 117ᵇ also control the power for operating solenoids 66 and 75. Switch 120 controls power to a jogging switch button (not shown) by which the motor in position B can be "jogged" or intermittently started and stopped by pressing and releasing the said button. A similar switch in position A is not required.

The compensator mechanism, shown in Figure 1, comprises two vertical frameworks 128, 129 respectively, the latter having a multiple-grooved pulley 130 journaled at its upper end, and slidably supporting a carriage 131 in which a multiple-grooved pulley 132 is journaled. Strip material 11 from a source of supply (not shown) passes around the pulleys 130, 132 in a plurality of convolutions 133 as shown, the arrangement providing storage for a substantial amount of the strip material. The infeed into the storage loops 133 is constant, whereas the out-feed therefrom is intermittent, the carriage 131 rising and falling according as the amount of material in the storage loops varies. An upper limit switch 134 and a lower limit switch 135 are mounted upon the framework 129 in the path of the carriage 131 and adapted to be actuated thereby, the upper switch 134 to stop the out-feed of the strip material when the storage supply reaches a determinate minimum, and the lower switch to stop the in-feed when the storage supply reaches a determinate maximum amount.

On the side of the framework 128 nearest the bead-core winding mechanism is journaled a grooved guide-sheave 137 that is positioned at the same elevation as the pulley 130 and receives the strip of material 11 passing off said pulley and guides it toward the guide-roller 63. Between the pulley 130 and the guide-sheave 137 the strip material 11 is engaged by a grooved pulley 138 that is journaled in the outer end of an elongate yoke 139 that is mounted upon the outer end of the piston rod 140 of a vertically arranged double-acting fluid pressure operated cylinder 141. The yoke 139 slides between suitable guide-plates 142, 142 mounted upon the framework 129, and slotted guides 143, 143 for the strip material 11 are mounted upon the upper end of said framework on opposite sides of the course of the pulley 138. The arrangement is such that downward movement of the pulley 138 will form a bight in the strip material 11 between the pulley 130 and sheave 137, as is most clearly shown in broken lines in Figure 1.

The fluid pressure cylinder 141 is provided with the usual fluid inlet-and-outlet pipes 145, 145 connecting its respective ends to a four-way valve 146 that is connected with a fluid supply pipe 147 from a source of pressure fluid (not shown), and has an exhaust port 148. The valve 146 is operated by a solenoid 149 that is controlled by the electrical switches 114ª and 114ᵇ, the arrangement being such that the upper end of the cylinder 141 is charged and the pulley 138 is in its lower position when the bead core winding mechanism is running, either in position A or position B, the condition of the cylinder and pulley being reversed when said mechanism stops running, so that the pulley is in its upper position. Because the eccentric 64 prevents recession of the strip material 11 from the core winding mechanism, the rising of the pulley 138 will convert the bight in the material 11 into a slackness between sheave 137 and guide roller 63. This permits the operator easily to pull forward the leading end of the strip 11 to attach it to a form 16 at the beginning of each core-winding operation.

In the operation of the machine, bead cores are wound first on one form 16 and then on the other, the interval required for winding a core, say four revolutions of the form, being consumed by the operator in removing the finished core from the previously wound form. Operation is started, say in position A as shown, when the operator inserts the leading end of the continuous strip 11 into the slot 18 of the form 16 where it is engaged by pawl 20, and presses the starting button (not shown). This energizes motor 30 which rotates form 16 and causes it to wrap the strip 11 about itself in a plurality of convolutions, say four, which number is determined by the time required for the cam disc 88, also driven by the motor, to make half a revolution. Initial movement of the cam disc 88 moves the cam 112 off the switch 114 and thereby causes the pulley 138 of the compensator mechanism to move downwardly and thus to form a bight in the strip material 11 between pulley 130 and sheave 137.

When the cam disc 88 has made half a revolution the cams 112 thereon engage and throw respective switches 113ª and 114ª with the result that the pulley 138 of the compensator mechanism rises to provide slack in the strip material 11, the motor 30 stops rotating quickly to prevent over-run of strip material 11 on the form 16, and the solenoid 66 is actuated to lift the plate 58 whereby the strip 11 between the guide rollers 59 on said plate and the form 16 is lifted into position between the blades of shears 70. Lifting of the plate 58 causes the ear 58ª thereon to operate the switch 71ª which energizes the corresponding solenoid 75, with the result that the latter closes the shears 70 and severs the strip material 11. Actuation of solenoid 75 causes the depending finger 86 thereof to operate the switch 85ª which energizes solenoid 54 whereby the latter operates the valve 51 to charge the cylinder 46 in a manner to cause said cylinder to move the mechanism C to the B position. Movement of mechanism C de-energizes solenoids 66 and 75 and permits the parts controlled thereby to resume their normal positions. This completes a cycle of operation which may be repeated with the mechanisms in the B position.

Figure 4:
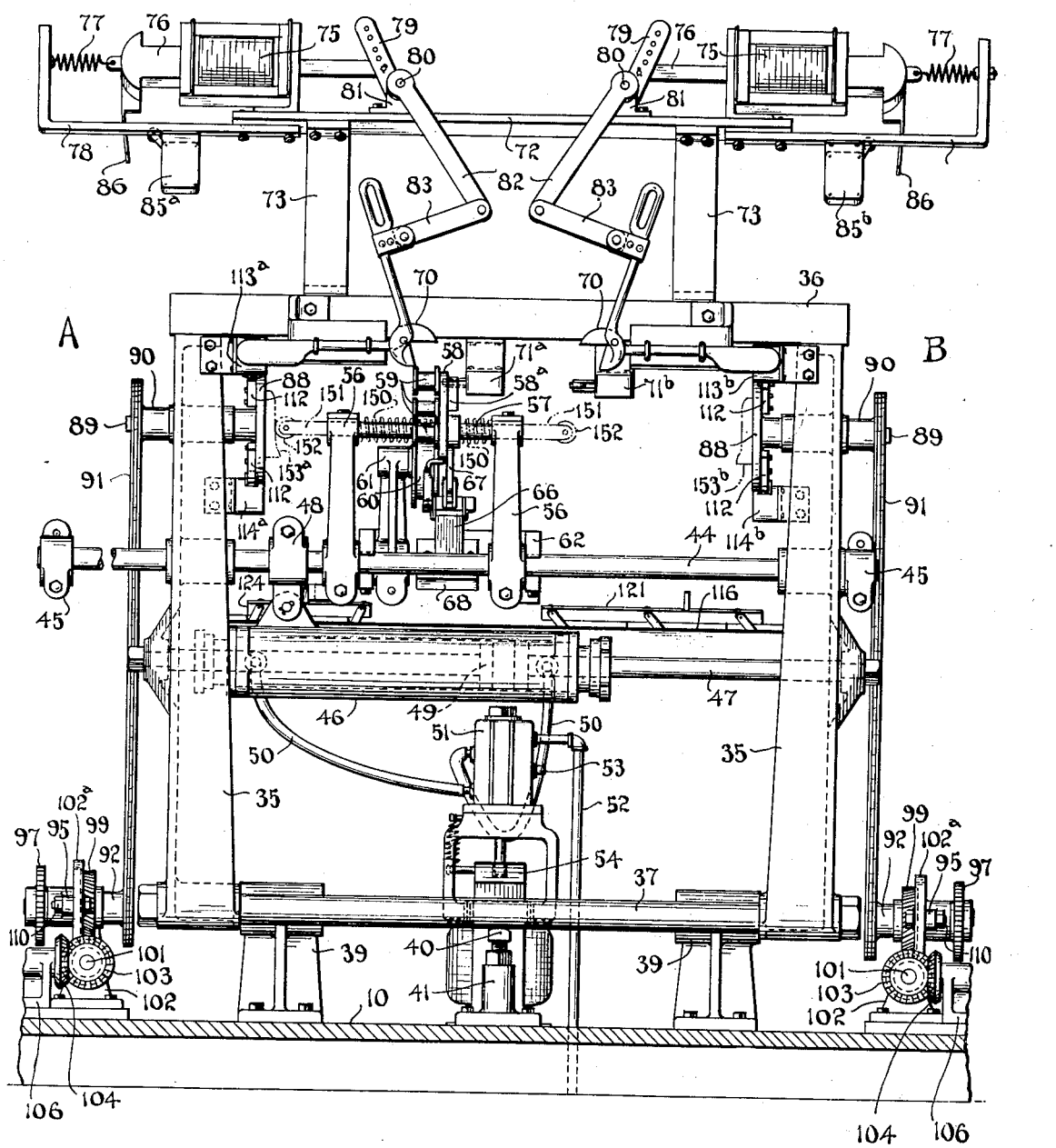
Figure 4 is a section on the line 4—4 of Figure 3.

As hereinbefore stated, the machine is adapted readily to be altered for the manufacture of bead cores that are triangular in section, attention being directed to the broken line structure shown in Figure 4. In the modified structure the bar 57 is mounted for axial movement in the brackets 56, and compression springs 150, 150 are mounted upon the said bar between the plate 58 thereon and the respective brackets 56 for keeping said plate and the bar 57 normally centrally positioned between the brackets. The end portions of the bar 57, laterally of the brackets, are provided with respective yokes 151, 151 which carry cam-rollers 152 that are adapted alternately to engage face cams 153ª, 153ᵇ that are secured to the adjacent faces of the respective cam-discs 88. Each of the cams 153ª, 153ᵇ is so shaped as to impart the desired lateral reciprocatory movement to the plate 58 whereby the strip material 11 is fed onto the forms 16 in a manner to build up a bead core of triangular section thereupon.

The machine is capable of rapid production of bead cores of rectangular or triangular section, and accomplishes the several objects set forth in the foregoing statement of objects.

Modification may be resorted to within the scope of the appended claims which are not limited wholly to the specific construction shown and described.

What is claimed is:

1. In apparatus for making annular bead cores, the combination of two winding positions comprising rotatable annular forms and strip severing means associated therewith, guiding means for a continuous strip of material adapted to be aligned in alternation with said winding forms, means for causing the strip guiding means to carry the strip into engagement with the strip severing means after a determinate number of revolutions of a winding form, and means for actuating the strip severing means energized by the strip guiding means in its movement that carries the strip into engagement with the strip severing means.

2. In apparatus for making annular bead cores, the combination of a pair of rotatable annular forms, guide means for a continuous strip of bead core forming material adapted to be aligned in alternation with said winding forms, means for severing the strip material after a determinate amount is wound on one form, and means actuated by the strip severing means for shifting the guide means laterally to align it with the other form.

3. In apparatus for making annular bead cores, the combination of bead core winding mechanism, compensator mechanism for supplying a continuous strip of bead-core forming material thereto, said compensator comprising means for forming a bight in the continuous strip material, and means controlled by the bead winding mechanism for operating the bight forming mechanism at determinate intervals during the operation of the bead winding mechanism.

4. In apparatus for making annular bead cores, the combination of bead core winding mechanism, compensator mechanism for supplying a continuous strip of bead-core forming material thereto, said compensator comprising means for forming a bight in the continuous strip material, and means on the bead winding mechanism controlling the compensator mechanism to cause the latter to form a bight in the strip material when the bead winding mechanism is winding a bead, and to release said bight to cause slackness in the strip material when said bead winding mechanism stops operating.

5. In apparatus for making annular bead cores, the combination of a bead core winding machine, compensator mechanism for supplying a continuous strip of bead-core forming material thereto, said compensator comprising a pulley engaging the strip material and adapted to be moved transversely of the course of the strip material to form a bight therein, and means on the bead winding machine controlling the movement of said pulley in determinate time relation to the operation of the bead winding machine.

6. In apparatus of the character described, the combination of a pair of rotatable bead core winding forms, the guide means for guiding a single continuous strip of bead core forming material in alternation to said forms, compensator mechanism for supplying the continuous strip material to the forms, said compensator comprising means engaging the strip material and movable transversely thereof for forming a bight in said material, and means associated with each form for controlling the operation of the bight-forming means in determinate time relation to the starting and stopping of the rotation of each form.

7. In apparatus of the character described, the combination of a pair of annular rotatable bead-core winding forms, guide means for a continuous strip of bead-core forming material adapted to be aligned in alternation with said forms, drive means for said forms, and respective control means for controlling the operation of the forms and guide means in the alternative positions of the latter.

8. A combination as defined in claim 7 in which the control means is constructed and arranged to operate in timed relation to the rotation of the core-winding forms.

HORACE D. STEVENS.